(12) United States Patent
Ke

(10) Patent No.: US 11,461,576 B2
(45) Date of Patent: Oct. 4, 2022

(54) INFORMATION PROCESSING METHOD AND RELATED ELECTRONIC DEVICE

(71) Applicant: Lenovo (Beijing) Co., Ltd., Beijing (CN)

(72) Inventor: Haibin Ke, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 482 days.

(21) Appl. No.: 16/455,238

(22) Filed: Jun. 27, 2019

(65) Prior Publication Data

US 2020/0005037 A1    Jan. 2, 2020

(30) Foreign Application Priority Data

Jun. 29, 2018    (CN) .......................... 201810696210.7

(51) Int. Cl.
*G06K 9/00* (2022.01)
*G06N 20/20* (2019.01)
*G06V 10/75* (2022.01)

(52) U.S. Cl.
CPC ......... *G06K 9/00536* (2013.01); *G06N 20/20* (2019.01); *G06V 10/757* (2022.01)

(58) Field of Classification Search
CPC ............. G06K 9/00536; G06K 9/6211; G06K 9/6228; G06K 9/00677; G06K 9/622; G06N 20/20; G06N 5/003; G06N 3/0454
See application file for complete search history.

(56) References Cited

U.S. PATENT DOCUMENTS

| | | | |
|---|---|---|---|
| 9,235,782 B1* | 1/2016 | Zomet | G06K 9/00281 |
| 9,576,221 B2* | 2/2017 | Mayle | G06K 9/6269 |
| 2013/0163870 A1* | 6/2013 | Cao | G06K 9/00281 382/170 |
| 2016/0180468 A1* | 6/2016 | Buss | G06K 9/00691 705/4 |
| 2019/0163767 A1* | 5/2019 | Ke | G06K 9/6256 |

FOREIGN PATENT DOCUMENTS

| | | |
|---|---|---|
| CN | 106095876 A | 11/2016 |
| CN | 107977431 A | 5/2018 |
| WO | 2016154814 A1 | 10/2016 |

* cited by examiner

*Primary Examiner* — Tom Y Lu
(74) *Attorney, Agent, or Firm* — Anova Law Group, PLLC

(57) ABSTRACT

A method includes receiving a first operation instruction; responsive to receiving the first operation instruction, determining whether one or more first images from a set of images comprise a first common feature; and responsive to determining that the one or more first images from the set of images comprise the first common feature, displaying the one or more first.

17 Claims, 1 Drawing Sheet

INFORMATION PROCESSING METHOD AND RELATED ELECTRONIC DEVICE

CROSS-REFERENCE TO RELATED APPLICATION

This application claims priority of Chinese Patent Application No. 201810696210.7, filed on Jun. 29, 2018, the entire content of which is incorporated herein by reference.

TECHNICAL FIELD

The present disclosure relates to the field of electronic technologies, and in particular, to an information processing method and an electronic device.

BACKGROUND

Photographing functions in electronic devices have become more popular over time. Users usually record many images when they encounter scenes of interest and may also record food scenes when traveling. In addition, users may download a large number of images from the Internet or receive a large number of images from friends. Therefore, the electronic devices usually store a very large amount of image data, which help store the required image information, but may require more time for a user to search for a specific image.

SUMMARY

In accordance with the disclosure, one aspect of the present disclosure provides an information processing method. The method includes receiving a first operation instruction; responsive to receiving the first operation instruction, determining whether one or more first images from a set of images comprise a first common feature; and responsive to determining that the one or more first images from the set of images comprise the first common feature, displaying the one or more first.

In accordance with the disclosure, another aspect of the present disclosure provides an electronic device. The electronic device includes a processor and a memory coupled to the processor. The memory stores instructions that, when executed by the processor, cause the processor to receive a first operation instruction; responsive to receiving the first operation instruction, determine whether one or more first images from a set of images comprise a first common feature; and responsive determining that the one or more first images from the set of images comprise the first common feature, display the one or more first images.

In accordance with the disclosure, another aspect of the present disclosure provides a method for image processing. The method includes obtaining a first training model for recognizing a first common feature, determining whether one or more first images from a set of images comprise the first common feature; and responsive to determining that the one or more first images from the set of images comprise the first common feature, displaying the one or more first images.

DETAILED DESCRIPTION

Various aspects and features of the present disclosure are described herein with reference to the drawings.

It should be understood that various modifications may be made to the embodiments of the present disclosure. The embodiments described below are merely a part of, not all of embodiments of the present disclosure. Any other embodiment obtained by those skilled in the art based on the embodiments of the present disclosure without creative efforts shall fall within the scope of the present disclosure.

As a part of the specification of the present disclosure, the accompanying drawings together with the above brief descriptions and the below detail descriptions about some embodiments of the present disclosure are used to explain the discipline of the present disclosure.

Blew described features and other features of the present disclosure are apparent through the following description of the embodiments of the embodiments.

It will also be appreciated that, although the present disclosure is described with reference to specific embodiments, those skilled in the art should be able to implement many other equivalents of these embodiments, which have the features of the claims and are therefore within the scope of the present disclosure.

Aspects, features, and advantages of the present disclosure are clearer with reference to the accompany drawings.

Specific embodiments of the present disclosure are described hereinbelow with reference to the drawings; however, it is understood that the disclosed embodiments are merely examples of the present disclosure, which can be implemented in various ways. The well-known and/or repeated functions and structures are not described in detail to avoid unnecessary details. Therefore, specific structural and functional details are not intended to limit, but are merely used as a basis to teach one skilled in the art to implement any suitable detail of the disclosure.

The disclosure uses the phrases "in one embodiment", "in another embodiment", or "in other embodiments", which may be referred to the same embodiment or one or more of different embodiments.

Figure 1:
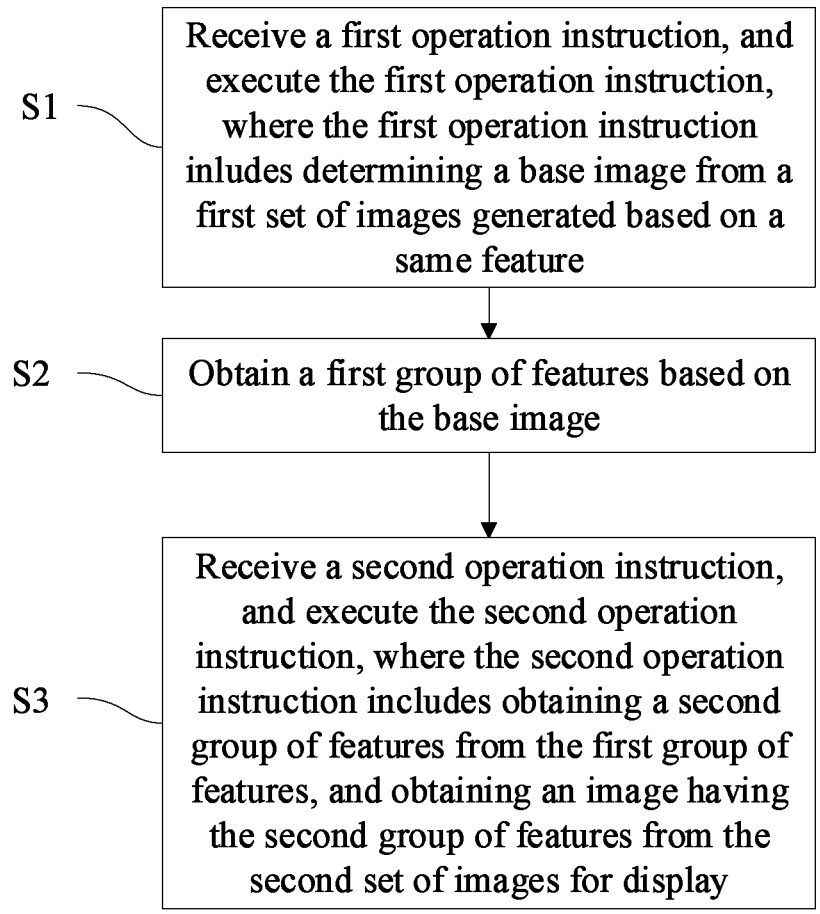
FIG. 1 is a schematic flowchart of an information processing method according to some embodiments of the present disclosure.
Figure 2:
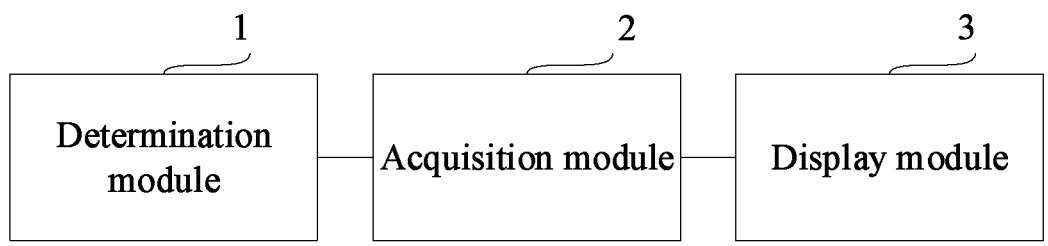
FIG. 2 is a structural block diagram of an electronic device according to some embodiments of the present disclosure.

As shown in FIG. 1, an embodiment of the present disclosure discloses an information processing method, which can be applied to an electronic device, such as a mobile phone, a tablet computer, a notebook computer, a camera, etc.

The information processing method may include the following steps.

In S1, a first operation instruction is received and executed, where the first operation instruction includes determining a base image from a first set of images generated based on a same feature. The base image may be an image or a video. An image in the first set of images may be generated based on the same feature, the base image is determined from the first set of images, and the base image includes at least the same feature. For example, the electronic device includes a plurality of images, and the plurality of images are grouped according to features to generate a plurality of set of images. For example, each of the plurality of set of images includes the same feature, and the base image may be an image of a set of images determined from a plurality of sets of images. In some embodiments, when the electronic device groups multiple images according to an feature A and a feature B to generate two set of images, that is, the images including the feature A in the plurality of images are grouped into a set A of images, and the images including the feature B in the plurality of images are grouped into a set B of images. The base image may be one or more images having the feature A in the set A of images can be determined the base image.

In S2, a first group of features may be determined based on the base image. The first group of features may include a facial feature, a temporal feature, and/or a location feature, etc. The first group of features may also include a scenery feature. A number of the features is not limited herein. For example, if the base image is an image of three tourists watching the sunset on a beach in Hainan, the first group of features may include three facial features of the three tourists (e.g., faces of the three tourists), two location features (e.g., Hainan and the beach), and one temporal feature (e.g., nightfall). For another example, if the base image may be a person swimming in a pool on Sunday, the first group of features may include one facial feature (e.g. the face of the person), one temporal feature (e.g., Sunday), and one location feature (e.g., the pool).

The facial features characterize faces of different people. The temporal feature may include a time-point feature and a time-period feature. For example, a time point when an image is captured can be determined as a time-point feature, a time period when a video is recorded can be determined as a time-period feature, or a time point when an image is captured plus a preset time interval value (for example, an interval of −5 minutes to +5 minutes) can be determined as a time-period feature, or a start time for recording a video can be determined as a time-point feature. The location feature may also include a location coordinate feature and a location coordinate interval feature. For example, a location coordinate where an image is captured can be determined as a location coordinate feature, or a location coordinate where an image is captured plus a preset location interval value (e.g., a latitude coordinate interval of −5 to +5 degree, and/or the longitude coordinate interval of −5 to +5 degree) can be determined as the location coordinate interval feature, or a location coordinate interval where a video is recorded can be determined as the location coordinate interval feature, or a location coordinates where a video is started to record can be determined as a location coordinate feature.

In S3, a second operation instruction is received and executed, where the second operation instruction includes selecting a second group of features from the first group of features, and obtaining one or more images having the second group of features from a second set of images for display.

In some embodiments, when displaying the one or more images having the second group of features, the base image and the one or more images having the second group of features can be displayed together. In some other embodiments, the base image can be displayed in a center position of the one or more images having the second group of features.

In some embodiments, the first operation instruction can be received and executed again to redetermine the base image in the one or more images having the second group of features.

A number of features included in the second group of features is no more than the number of features included in the first group of features. The second group of features may include facial features, temporal features, and/or location features, etc. For example, if the base image is an image of three tourists watching the sunset on a beach in Hainan, the first group of features may include three facial features of the three tourists (e.g., faces of the three tourists), two location features (e.g., Hainan and the beach), and one temporal feature (e.g., nightfall). The second group of features may include two location features (e.g., Hainan and the beach). When the two location features are selected, one or more images having the two location features can be selected from the second set of images for display. The second set of images can be a different set of images from the first set of images, or may also be a set of images including all the images stored in the electronic device.

For example, a plurality of images can be grouped based on the same feature. The image including a feature A may be grouped into a set A of images, and the image including a feature B is grouped into a set B of images, and the image including a feature C is grouped into a set C of images. A target image desired may have the feature A, but the feature A is not recognized, and the target image is not grouped into the set A of images, and cannot be found when the user wants to find the target image from the set A of images. At this time, the user realizes that the target image further includes the feature B and the feature C. The base image can be determined from the set A of images, and the feature B and feature C can be selected from the first group of features obtained based on the base image. The images having the feature B and the feature C can be grouped from the plurality of images. That is, the images having the feature B and feature C can be selected from the plurality of images for display. The user can find the target image based on the displayed images. As such, it is convenient for the user to find the target image from a large number of images.

For example, a plurality of images can be grouped based on the same feature. The image including a feature A may be grouped into a set A of images, and the image including a feature B is grouped into a set B of images, and the image including a feature C is grouped into a set C of images. A target image desired may have the feature A, but the feature A is not recognized, and the target image is not grouped into the set A of images, and cannot be found when the user wants to find the target image from the set A of images. At this time, the user realizes that the target image further includes a feature D. The base image can be determined from the set A of images, and the feature D can be selected from the first group of features obtained based on the base image. The images having the feature D can be grouped from the plurality of images. That is, the images having the feature D can be selected from the plurality of images for display. The user can find the target image based on the displayed images. As such, it is convenient for the user to find the target image from a large number of images.

In some embodiments, the information processing method further includes the following.

A third operation instruction can be received and executed. At least one feature from a plurality of images can be recognized to form the first set of images, where the first set of images including images corresponding to each of the at least one feature. The plurality of images may be some images selected by the user or may be all images stored in the electronic device. For example, according to the existing training model capable of recognizing features, a plurality of images are input into the training model for training, and features included in each of the plurality of images are recognized, and images having the same feature are combined to form the first set of images.

In some embodiments, the information processing method further includes the following.

In some embodiments, the display module 3 is configured to display the first group of features on the base image by marking objects in the base image. After the determination module 1 determines the base image, the acquisition module 2 obtains the first group of features based on the base image, and the display module 3 displays each feature included in the obtained first group of features in a manner corresponding to the object in the base image. For example, if the base image is an image of three tourists watching the sunset on a beach in Hainan, the first group of features may include three facial features of the three tourists (e.g., faces of the three tourists), two location features (e.g., Hainan and the beach), and one temporal feature (e.g., nightfall). The three facial features of the three tourists may be displayed corresponding to the locations of the three faces of the three tourists. Hainan can be displayed as one location feature corresponding to the center position of the image. The beach can be displayed as another location feature at a potion where the beach is in the image. The nightfall can be displayed as a temporal feature at a potion where the sunset is in the image. Each feature in the first group of features can be marked on the object in the base image in the form of a suspended sphere.

In some embodiments, an interface can also be displayed on the base image, and the first group of features included in the base image can be displayed on the interface. In order to make the user conveniently see the base image and to display the user the interface which displaying the first group of features, a transparency of the interface can be automatically adjusted according to the base image.

In some embodiments, the information processing method further includes the following.

A first training model capable of recognizing features can be obtained through using a predetermined number of images for training.

The first training model is capable of recognizing features in the image through using a predetermined number of images for training to obtain a first training model. For example, 500 images including a face are used for training to obtain a first training model capable of recognizing facial features. For example, 500 images including a hat are used for training to obtain a first training model capable of recognizing the hat features.

For example, 500 images that have been marked with the feature A may be input into the initial training model for training, so as to enable the initial training model to analyze 500 images based on the feature a, that is, enable the initial training model to perform deep learning, and finally obtain a first training model capable of a feature recognition of the image by repeatedly training based on 500 images. By using the images of other features such as the feature B for training, a first training model capable of recognizing other features such as the feature B of the image can be obtained. The machine learning algorithm used in the process of obtaining the first training model may be a decision tree algorithm, a random forest algorithm, a logistic regression algorithm, a neural network algorithm, etc. A framework for machine learning can be a NXNet framework, a PyTorch framework, and a Caffe framework.

Through the above-mentioned training, the first training model can continuously improve the analysis of images and features in the process of deep learning, and can also continuously verify and improve the feature recognition of the image, to realize the first training model. As such, the first training model can be automatically upgraded continuously to achieve artificial intelligence.

In some embodiments, the acquisition module 2 is configured to obtain a first group of features based on the first training model and the base image. The base image is input into the first training model, and the first training model can identify features in the base image to obtain a first group of features composed of features included in the base image. In the process of performing feature recognition after inputting the base image into the first training model, the first training model may be further trained to make the first training model more intelligent.

In some embodiments, obtaining one or more images having the second group of features from the second set of images may include the following.

Based on the second training model, feature extraction is performed on the second set of images to obtain the one or more images having the second group of features. The second training model may be a model that has been trained in the existing technologies. The second set of images is input to the second training model for feature extraction, and the one or more images having the second group of features in the second set of images can be obtained.

Some embodiments of the present disclosure also disclose an electronic device. The electronic device may include a mobile phone, a tablet computer, a notebook computer, a camera, etc. The electronic device may include a processor and a memory. The memory can store computer readable instructions. When the instructions are executed by the processor, the computer readable instructions can perform the information processing method consistent with the method embodiments described above. The functions of the processor can be implemented by one or more modules described below.

A determination module 1 is configured to determine a base image from a first set of images generated based on a same feature.

The base image may be an image or a video. An image in the first set of images may be generated based on the same feature, the base image is determined from the first set of images, and the base image includes at least the same feature. For example, the electronic device includes a plurality of images, and the plurality of images are grouped according to features to generate a plurality of set of images. For example, each of the plurality of set of images includes the same feature, and the base image may be an image of a set of images determined from a plurality of sets of images. In some embodiments, when the electronic device groups multiple images according to an feature A and a feature B to generate two set of images, that is, the images including the feature A in the plurality of images are grouped into a set A of images, and the images including the feature B in the plurality of images are grouped into a set B of images. The base image may be one or more images having the feature A in the set A of images can be determined the base image.

An acquisition module 2 is configured to obtain a first group of features based on the base image.

The first group of features may also include a scenery feature. A number of the features is not limited herein. For example, if the base image is an image of three tourists watching the sunset on a beach in Hainan, the first group of features may include three facial features of the three tourists (e.g., faces of the three tourists), two location features (e.g., Hainan and the beach), and one temporal feature (e.g., nightfall). For another example, if the base image may be a person swimming in a pool on Sunday, the first group of features may include one facial feature (e.g. the face of the person), one temporal feature (e.g., Sunday), and one location feature (e.g., the pool).

The facial features characterize faces of different people. The temporal feature may include a time-point feature and a time-period feature. For example, a time point when an image is captured can be determined as a time-point feature, a time period when a video is recorded can be determined as a time-period feature, or a time point when an image is captured plus a preset time interval value (for example, an interval of −5 minutes to +5 minutes) can be determined as a time-period feature, or a start time for recording a video can be determined as a time-point feature. The location feature may also include a location coordinate feature and a location coordinate interval feature. For example, a location coordinate where an image is captured can be determined as a location coordinate feature, or a location coordinate where an image is captured plus a preset location interval value (e.g., a latitude coordinate interval of −5 to +5 degree, and/or the longitude coordinate interval of −5 to +5 degree) can be determined as the location coordinate interval feature, or a location coordinate interval where a video is recorded can be determined as the location coordinate interval feature, or a location coordinates where a video is started to record can be determined as a location coordinate feature.

The display module 3 is configured to select a second group of features from the first group of features, and obtain one or more images having the second group of features from the second set of images for display.

A number of features included in the second group of features is no more than the number of features included in the first group of features. The second group of features may include facial features, temporal features, and/or location features, etc. For example, if the base image is an image of three tourists watching the sunset on a beach in Hainan, the first group of features may include three facial features of the three tourists (e.g., faces of the three tourists), two location features (e.g., Hainan and the beach), and one temporal feature (e.g., nightfall). The second group of features may include two location features (e.g., Hainan and the beach). When the two location features are selected, one or more images having the two location features can be selected from the second set of images for display. The second set of images can be a different set of images from the first set of images, or may also be a set of images including all the images stored in the electronic device.

For example, a plurality of images can be grouped based on the same feature. The image including a feature A may be grouped into a set A of images, and the image including a feature B is grouped into a set B of images, and the image including a feature C is grouped into a set C of images. A target image desired may have the feature A, but the feature A is not recognized, and the target image is not grouped into the set A of images, and cannot be found when the user wants to find the target image from the set A of images. At this time, the user realizes that the target image further includes the feature B and the feature C. The base image can be determined from the set A of images, and the feature B and feature C can be selected from the first group of features obtained based on the base image. The images having the feature B and the feature C can be grouped from the plurality of images. That is, the images having the feature B and feature C can be selected from the plurality of images for display. The user can find the target image based on the displayed images. As such, it is convenient for the user to find the target image from a large number of images.

For example, a plurality of images can be grouped based on the same feature. The image including a feature A may be grouped into a set A of images, and the image including a feature B is grouped into a set B of images, and the image including a feature C is grouped into a set C of images. A target image desired may have the feature A, but the feature A is not recognized, and the target image is not grouped into the set A of images, and cannot be found when the user wants to find the target image from the set A of images. At this time, the user realizes that the target image further includes a feature D. The base image can be determined from the set A of images, and the feature D can be selected from the first group of features obtained based on the base image. The images having the feature D can be grouped from the plurality of images. That is, the images having the feature D can be selected from the plurality of images for display. The user can find the target image based on the displayed images. As such, it is convenient for the user to find the target image from a large number of images.

In some embodiments, when the display module 3 is configured to display one or more images having the second group of features, the base image and the one or more images having the second group of features can be displayed together. Optionally, the base image is displayed in a center position of the one or more images having the second group of features.

In some embodiments the first operation instruction can be received and executed again to redetermine the base image in the one or more images having the second group of features.

In some embodiments, the electronic device further includes the following.

A grouping module configured to receive and execute the third operation instruction to recognize at least one feature from the plurality of images to form the first set of images, where the first set of images including images corresponding to each of the at least one feature. The plurality of images may be some images selected by the user, or may be all images stored in the electronic device. For example, according to the existing training model capable of recognizing features, a plurality of images are input into the training model for training, and features included in each of the plurality of images are recognized, and images having the same feature are combined to form the first set of images.

In some embodiments, the display module 3 is configured to display the first group of features on the base image by marking objects in the base image. After the determination module 1 determines the base image, the acquisition module 2 obtains the first group of features based on the base image, and the display module 3 displays each feature included in the obtained first group of features in a manner corresponding to the object in the base image. For example, if the base image is an image of three tourists watching the sunset on a beach in Hainan, the first group of features may include three facial features of the three tourists (e.g., faces of the three tourists), two location features (e.g., Hainan and the beach), and one temporal feature (e.g., nightfall). The three facial features of the three tourists may be displayed corresponding to the locations of the three faces of the three tourists. Hainan can be displayed as one location feature corresponding to the center position of the image. The beach can be displayed as another location feature at a potion where the beach is in the image. The nightfall can be displayed as a temporal feature at a potion where the sunset is in the image. Each feature in the first group of features can be marked on the object in the base image in the form of a suspended sphere.

In some embodiments, an interface can also be displayed on the base image, and the first group of features included in the base image can be displayed on the interface. In order to make the user conveniently see the base image and to display the user the interface which displaying the first group of features, a transparency of the interface can be automatically adjusted according to the base image.

In some embodiments, the electronic device further includes the following.

A training module is configured to obtain a first training model capable of recognizing a feature through using a predetermined number of images for training.

The first training model is capable of recognizing features in the image through using a predetermined number of images for training to obtain a first training model. For example, 500 images including a face are trained to obtain a first training model capable of recognizing facial features. For example, 500 images including a hat are used for training to obtain a first training model capable of recognizing the hat features.

For example, 500 images that have been marked with the feature A may be input into the initial training model for training, so as to enable the initial training model to analyze 500 images based on the feature a, that is, enable the initial training model to perform deep learning, and finally obtain a first training model capable of a feature recognition of the image by repeatedly training based on 500 images. By using the images of other features such as the feature B for training, a first training model capable of recognizing other features such as the feature B of the image can be obtained. The machine learning algorithm used in the process of obtaining the first training model may be a decision tree algorithm, a random forest algorithm, a logistic regression algorithm, a neural network algorithm, etc. A framework for machine learning can be a NXNet framework, a PyTorch framework, and a Caffe framework.

Through the above-mentioned training, the first training model can continuously improve the analysis of images and features in the process of deep learning, and can also continuously verify and improve the feature recognition of the image, to realize the first training model. As such, the first training model can be automatically upgraded continuously to achieve artificial intelligence.

In some embodiments, the acquisition module 2 is configured to obtain a first group of features based on the first training model and the base image. The base image is input into the first training model, and the first training model can identify features in the base image to obtain a first group of features composed of features included in the base image. In the process of performing feature recognition after inputting the base image into the first training model, the first training model may be further trained to make the first training model more intelligent.

In some embodiments, the display module 3 is configured to perform feature extraction on the second set of images based on the second training model to obtain one or more images having the second group of features. The second training model may be a model that has been trained in the existing technology. The second set of images is input to the second training model for the feature extraction, so as to obtain the image including the second group of features in the second set of images.

It can be understood that the above modules may be combined in one module, or any one of the modules may be divided into multiple modules. Alternatively, at least some of the functions of one or more of these modules may be combined with at least some of the functions of other modules and implemented in one module. According to an embodiment of the present disclosure, one or more of the above modules may be at least partially implemented as a hardware circuit. For example, the hardware circuit can be a field programmable gate array (FPGA), a programmable logic array (PLA), a system-on-chip, a system-on-substrate, a system-on-package and an application specific integrated circuit (ASIC), etc. In some other embodiments, one or more of the above modules may be implemented in any other reasonable manner that integrates or encapsulates the circuit using hardware or firmware. In some other embodiments, one or more of the above modules may be implemented in an appropriate combination of three forms of software, hardware, and firmware. Alternatively, one or more of the above modules may be at least partially implemented as a computer program module, and when the program is executed by a computer, the functions of the corresponding modules may be achieved.

The above embodiments are merely exemplary embodiments of the present disclosure, and are not intended to limit the present disclosure, and the scope of protection of the present disclosure is defined by the claims. A person skilled in the art may make various modifications or equivalent substitutions to the present disclosure within the spirit and scope of the present disclosure. Such modifications or equivalents are also considered to fall within the scope of the present disclosure.

What is claimed is:

1. An information processing method, comprising:
receiving a first operation instruction;
responsive to receiving the first operation instruction, determining a first common feature based on one or more first images from a set of images;
determining a base image having the first common feature;
receiving a second operation instruction;
responsive to receiving the second operation instruction, determining a second common feature from the first common feature in one or more second images among the first images; and
displaying the base image, an interface having the first common feature, and the one or more second images, with the base image placed at a predetermined location among the one or more second images, and the interface having a transparency automatically adjusted according to the base image.

2. The method of claim 1, further comprising:
obtaining a first training model for recognizing the first common feature.

3. The method of claim 1, further comprising:
obtaining a second training model for recognizing the second common feature.

4. The method of claim 1, further comprising:
receiving a third operation instruction; and
responsive to receiving the third operation instruction, recognizing at least one feature from the set of images to form a group of images, wherein the group of images include images corresponding to each of the at least one feature.

5. The method of claim 1, wherein the first common feature comprises one of: one or more facial features, one or more temporal features, and one or more location features.

6. The method of claim 5, wherein the one or more temporal features include one of: one or more time-point features and one or more time-period features.

7. The method of claim 1, further comprising:
displaying, by marking one or more objects present in the one or more first images, the first common feature.

8. An electronic device comprising:
a processor; and a memory coupled to the processor and storing instructions that, when executed by the processor, cause the processor to:
receive a first operation instruction;
responsive to receiving the first operation instruction, determine a first common feature based on one or more first images from a set of images;
determining a base image having the first common feature;
receive a second operation instruction;
responsive to receiving the second operation instruction, determine a second common feature from the first common feature in one or more second images among the first images; and
display the base image, an interface having the first common feature, and the one or more second images, with the base image placed at a predetermined location among the one or more second images, and the interface having a transparency automatically adjusted.

9. The electronic device of claim 8, wherein the processor is further configured to display the first common feature in the one or more first images.

10. The electronic device of claim 8, wherein the processor is further configured to obtain a first training model for recognizing the first common feature.

11. The electronic device of claim 8, wherein the processor is further configured to:
obtain a second training model for recognizing the second common feature.

12. The electronic device of claim 8, the processor is further configured to:
receive a third operation instruction; and
responsive to receiving the third operation instruction, recognize at least one feature from the set of images to form a group of images, wherein the group of images include images corresponding to each of the at least one feature.

13. The electronic device of claim 8, wherein the first common feature comprises one of: one or more facial features, one or more temporal features, and one or more location features.

14. The electronic device of claim 13, wherein the one or more temporal features include one of: one or more time-point features and one or more time-period features.

15. A method for image processing, comprising:
obtaining a first training model for recognizing a first common feature based on one or more first images from a set of images;
determining a base image having the first common features;
receiving a second operation instruction;
obtaining a second training model for determining a second common feature from the first common feature in one or more second images among the first images; and
displaying the base image, an interface having the first common feature, and the one or more second images, with the base image placed at a predetermined location among the one or more second images, and the interface having a transparency automatically adjusted.

16. The method of claim 15, wherein the first common feature comprises one of: one or more facial features, one or more temporal features, and one or more location features.

17. The method of claim 16, wherein the one or more temporal features include one of: one or more time-point features and one or more time-period features.

* * * * *